United States Patent [19]

Coscia et al.

[11] 4,319,020

[45] Mar. 9, 1982

[54] POLYQUATERNARY FLOCCULANTS

[75] Inventors: Anthony T. Coscia, South Norwalk; Robert F. Tarvin, Fairfield; Dinshaw F. Bardoliwalla, Norwalk, all of Conn.

[73] Assignee: American Cyanamid Company, Stamford, Conn.

[21] Appl. No.: 213,300

[22] Filed: Dec. 5, 1980

[51] Int. Cl.³ ............................................. C08G 73/00
[52] U.S. Cl. .................................... 528/405; 525/523; 528/492
[58] Field of Search ................. 528/405, 492; 525/523

[56] References Cited

U.S. PATENT DOCUMENTS

| | | | |
|---|---|---|---|
| Re. 28,807 | 5/1976 | Panzer et al. | 528/405 |
| Re. 28,808 | 5/1976 | Panzer et al. | 528/405 |
| 3,954,680 | 5/1976 | Jansma | 528/405 |
| 4,054,542 | 10/1977 | Buckman et al. | 528/405 |

*Primary Examiner*—Earl A. Nielsen
*Attorney, Agent, or Firm*—William H. Calnan; Bruce F. Jacobs

[57] ABSTRACT

Polyquaternary polymeric flocculants, containing a substantially reduced total residual amount of epihalohydrin and 1,3-dihalo-2-propanol and less than about 1000 ppm of dialkylamine, are produced by reacting a polyquaternary polymer prepared from epihalohydrin, dialkylamine, and optionally a polyfunctional amine with a compound of the formula:

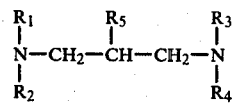

wherein $R_1$, $R_2$, $R_3$ and $R_4$ are alkyl ($C_1$–$C_3$), and $R_5$ is hydrogen or hydroxyl.

11 Claims, No Drawings

POLYQUATERNARY FLOCCULANTS

This invention relates to the preparation of polyquaternary polymeric flocculants from dialkylamines, epihalohydrins, and optionally polyfunctional polyamines, which contain a significantly reduced total amount of epihalohydrin and 1,3-dihalo-2-propanol and less than about 1000 ppm dialkylamine.

U.S. Pat. Nos. Re. 28,807 and Re. 28,808 teach the basic preparation of the polyquaternary polymers which form the starting material of the present invention. Commercially, these products are prepared from dimethylamine (DMA), epichlorohydrin (EPI) and optionally ethylenediamine (EDA). When so prepared, the resultant polymers have low residual levels of epichlorohydrin, but large residues of dimethylamine. In view of the fact that epichlorohydrin is reported to be a mutagen and has produced cancer in animals, the very low level thereof in the final product was critical to the use of the polyquaternary polymer as a flocculant for potable water clarification.

Recently it has been discovered that part of the epichlorohydrin found in commercial polymers is converted into 1,3-dichloro-2propanol (1,3-DCP), also reportedly a mutagen. Thus, there could be anywhere from 100 to 10,000 ppm of combined EPI and 1,3-DCP, and up to 2,000 ppm dimethylamine in a commercial polymer.

The use of these polyquaternary polymers containing amounts such as 3,000 ppm of combined EPI and 1,3-DCP as flocculants, at the maximum concentration of 20 milligrams per liter of water treated as allowed by the U.S. Environmental Protection Agency, means that the final clarified water would contain less than 100 parts per billion combined EPI and 1,3-DCP, well under the proposed standards for trihalomethanes set by the Environmental Protection Agency.

Nevertheless, in view of the public benefit to be gained by the use of chemical products which have reduced levels of chlorinated residues, there exists a need for further reducing the total residues of epichlorohydrin and 1,3-DCP in the flocculants, while at the same time limiting the residue of dimethylamine therein to less than 1000 ppm.

Accordingly, it is an object of the present invention to produce polyquaternary flocculants containing substantially reduced residues of epihalohydrin and b 1,3-dihalo-2-propanol, and less than about 1000 ppm dialkylamine.

This is accomplished by post-treating a polyquaternary polymer prepared from dialkylamine, epihalohydrin, and optionally a polyfunctional amine. The post treatment is performed by reacting the polyquaternary polymer with a compound of the formula:

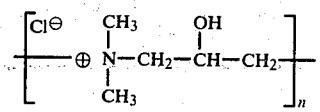

wherein $R_1$, $R_2$, $R_3$, and $R_4$ are alkyl ($C_{1-3}$), and $R_5$ is hydrogen or hydroxyl, at a temperature from about 85° C. to 90° C., for a period of at least about 1 hour. Preferably, $R_1$, $R_2$, $R_3$ and $R_4$ are methyl groups, $R_5$ is hydroxyl, and the reaction time is at least about two hours.

A 1,3-bis(dialkylamino)-2-propanol, corresponding to the above formula when $R_5$ is hydroxyl, may be readily prepared by reacting a dialkylamine, preferably dimethylamine, with an epihalohydrin, preferably epichlorohydrin, in about a 2:1 molar ratio, respectively at a temperature of from about 20° C. to 50° C. for about one to two hours.

A 1,3- bis(dialkylamino)-propane compound, corresponding to the above formula when $R_5$ is hydrogen, may be prepared by reacting a 1,3diahalopropane, preferably 1,3-dibromopropane, with an alcoholic dialkylamine, preferably dimethylamine, in solution at a temperature of about 150° C. for a prolonged period of time.

It is understood, however, that the particular method employed to prepare the compounds useful in the process of the instant invention does not constitute a feature of the invention.

The polyquaternary polymer which is treated by the present process may be prepared as disclosed and claimed in U.S. Pat. Nos. Re. 28,807 and Re. 28,808, both incorporated herein by reference. Generally, this entails the reaction of a lower dialkylamine, preferably dimethylamine, with an epihalohydrin, preferably epichlorohydrin, and optionally a polyfunctional amine, preferably ethylenediamine, until a polyquaternary polymer is produced which, as a 37% aqueous solution, by weight, based on the total weight of the cationic portion of said polyquaternary polymer, has a viscosity of 25° C. of at least 100 centistokes.

The present post-treatment may be performed by simply adding a sufficient amount of the treating compound to the polymeric flocculant and allowing sufficient time for it to react with the residual epihalohydrin and 1,3-dihalo-2-propanol present in said flocculant.

The following examples are provided for illustrative purposes only and the present invention is not in any way deemed limited thereby, except as set forth in the appended claims. All parts and percentages are by weight unless otherwise indicated.

EXAMPLE 1

A polyquaternary polymeric flocculant of the formula:

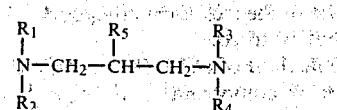

was prepared from epichlorohydrin and dimethylamine in accordancae with the process disclosed and claimed in U.S. Pat. No. Re. 28,807 and was adjusted to give high residue levels of combined EPI and 1,3-DCP (1,865 ppm) and DMA (73 ppm).

1,3-bis(dimethylamino)-b 2-propanol was prepared by reacting a 2:1 molar ratio of DMA to EPI at a temperature of 60° C. for 1 hour, and the residue levels were found to be as follows:
EPI—81 ppm,
1,3-DCP—less than 2 ppm;
DMA—58,000 ppm.

Residue levels were measured using gas chromatography.

Table I demonstrates that, upon treatment of the polyquaternary polymer with the 1,3-bis(dimethylamino)-2-propanol at 90° C., the total residual EPI and 1,3-DCP content of the polymer was significantly reduced with time, while the DMA residue was maintained well below 1,000 ppm.

TABLE I

| Treatment Time (hrs.) | Residues (ppm) | |
|---|---|---|
| | Combined EPI + 1,3-DCP | DMA |
| 0.5 | 1136 | — |
| 1 | 489 | 482 |
| 2 | 316 | 476 |

EXAMPLE 2

The polyquaternary polymer of Example 1 was treated with 1,3-bis(dimethylamino)-2-propanol, prepared as in Example 1 but containing 24 ppm EPI, less than 2 ppm 1,3-DCP and 57,000 ppm DMA, at 90° C.

Table II shows that the total residual level of EPI and 1,3-DCP in the polymer following treatment was again lowered, and the DMA residue remained less than 1,000 ppm.

TABLE II

| Treatment Time (hrs.) | Residues (ppm) | |
|---|---|---|
| | Combined EPI + 1,3-DCP | DMA |
| 0.5 | 1018 | — |
| 1 | 460 | 594 |
| 2 | 238 | 680 |

EXAMPLE 3

A flocculant was prepared from 100 parts epichlorohydrin, 99 parts dimethylamine and 1 part ethylenediamine in accordance with the process described in U.S. Pat. No. Re. 28,808 and the measured residue levels were 40 ppm, 52 ppm and 33 ppm for EPI, 1,3-DCP and DMA, respectively.

Adding 1,3-bis(dimethylamino)-2-propanol (residues of 81 ppm EPI; less than 2 ppm 1,3-DCP; 58,000 ppm DMA) at a 20 mole excess (assuming 500 ppm 1,3-DCP as the residue) in 2 charges of 10:1 each, spaced thirty minutes apart, coupled with heating at 90° C., yielded the residue results set forth in Table III.

TABLE III

| Treatment Time (hrs.) | Residues (ppm) | |
|---|---|---|
| | Combined EPI + 1,3-DCP | DMA |
| 0.5 | 17 | — |
| 1 | 13 | 439 |

EXAMPLE 4

The polymer of Example 3 was treated with the 1,3-bis(dimethylamino)-2-propanol of Example 2 in the manner specified in Example 3. The results of that treatment are set out in Table IV.

TABLE IV

| Treatment Time (hrs.) | Residues (ppm) | |
|---|---|---|
| | Combined EPI + 1,3-DCP | DMA |
| 0.5 | 29 | — |
| 1 | 13 | 550 |

It is noted that excellent residue levels for EPI, 1,3-DCP and DMA were obtained.

EXAMPLE 5

A polyquaternary polymer of the formula set forth in Example 3, but with residues as follows: combined EPI plus 1,3-DCP—64 ppm and DMA—853 ppm, was treated with the 1,3-bis(dimethylamino)-2-propanol of Example 2. The resulting polymer's residue levels are tabulated in Table V.

TABLE V

| Treatment Time (hrs.) | Residues (ppm) | |
|---|---|---|
| | Combined EPI + 1,3-DCP | DMA |
| 1 | 10 | 1,700 |
| 2 | 15 | 1,000 |

EXAMPLE 6

A polyquaternary polymer of the formula set forth in Example 3 was treated with a 5 mole excess of 1,3-bis(-dimethylamino)-propane (N,N,N',N'-tetramethyll,3-propanediamine at 90° C.

Table VI shows the residue levels of the treated polymer.

TABLE VI

| Treatment Time (hrs.) | Residues (ppm) | |
|---|---|---|
| | Combined EPI + 1,3-DCP | DMA |
| 3 | 16 | <1000 |
| 5 | 13 | <1000 |

What is claimed is:

1. A method for reducing the total combined epihalohydrin and 1,3-dihalo-2-propanol residue content of a polyquaternary polymer prepared from an epihalohydrin, a dialkylamine wherein the alkyl groups have about 1 to 3 carbon atoms, and optionally a polyfunctional amine, while maintaining the dialkylamine residue content of said polymer below about 1000 ppm, which comprises treating said polymer with a residue reducing effective amount of a treatment compound of the formula:

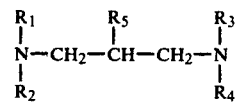

wherein $R_1$, $R_2$, $R_3$ and $R_4$ are alkyl ($C_1$–$C_3$), and $R_5$ is hydrogen or hydroxyl.

2. The method of claim 1 wherein the epihalohydrin is epichlorohydrin, the dialkylamine is dimethylamine and the optional polyfunctional amine is ethylenediamine.

3. The method of claim 1 or claim 2 wherein each $R_1$, $R_2$, $R_3$ and $R_4$ are each methyl, and $R_5$ is hydroxyl.

4. The method of claim 1 or claim 2 wherein the molar ratio of the treatment compound to the residues is from about 10 to 20:1.

5. The method of claim 1 wherein the molar ratio of the treatment compound to the residues is about 20:1.

6. The method of claim 5 wherein the treatment compound is added to the polymer in two essentially equal charges, spaced about thirty minutes apart.

7. The method of claim 1 wherein the reaction time is at least about one hour.

8. The method of claim 1 wherein the reaction time is at least about two hours.

9. The method of claim 1 wherein the reaction temperature is from about 80° C. to 90° C.

10. A polyquaternary polymer produced by post treating a polymer, prepared from an epihalohydrin, a dialkylamine wherein the alkyl groups have about 1 to 3 carbon atoms and optionally a polyfunctional amine, with a compound of the formula:

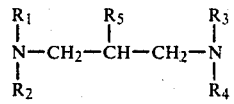

wherein $R_1$, $R_2$, $R_3$ and $R_4$ are alkyl ($C_1$–$C_3$), and $R_5$ is hydrogen or hydroxyl, in an amount effective to reduce the residues of the epihalohydrin and 1,3-dihalo-2-propanol.

11. The polyquaternary polymer of claim 10 wherein the epihalohydrin is epichlorohydrin, the dialkylamine is dimethylamine, the optional polyfunctional amine is ethylenediamine and the compound is 1,3-bis(dimethylamino)-2-propanol.

* * * * *